United States Patent
Ferrer Zaera et al.

(10) Patent No.: US 10,362,268 B2
(45) Date of Patent: Jul. 23, 2019

(54) ACCESSIBLE ELECTRONIC DOOR ENTRY SYSTEM

(71) Applicant: Fermax Design & Development, S.L.U., Valencia (ES)

(72) Inventors: Carlos Ferrer Zaera, Valencia (ES); Jose Ignacio Garcia Bort, Valencia (ES); Vicente Albert Perez, Valencia (ES)

(73) Assignee: Fermax Design & Development, S.L.U., Valencia (ES)

( * ) Notice: Subject to any disclaimer, the term of this patent is extended or adjusted under 35 U.S.C. 154(b) by 0 days.

(21) Appl. No.: 15/798,428

(22) Filed: Oct. 31, 2017

(65) Prior Publication Data

US 2018/0124356 A1   May 3, 2018

(30) Foreign Application Priority Data

Oct. 31, 2016   (ES) .................................. 201631302

(51) Int. Cl.
| | |
|---|---|
| *H04N 7/14* | (2006.01) |
| *G10L 15/02* | (2006.01) |
| *G10L 15/22* | (2006.01) |
| *H04N 5/378* | (2011.01) |
| *G10L 25/60* | (2013.01) |

(Continued)

(52) U.S. Cl.
CPC .............. *H04N 7/147* (2013.01); *G10L 15/02* (2013.01); *G10L 15/22* (2013.01); *G10L 25/60* (2013.01); *H04N 5/378* (2013.01); *H04N 7/18* (2013.01); *G10L 13/02* (2013.01); *G10L 2015/025* (2013.01); *G10L 2015/223* (2013.01); *G10L 2015/228* (2013.01)

(58) Field of Classification Search
CPC ......... G10L 15/02; G10L 15/22; G10L 25/60; G10L 13/02; G10L 2015/025; G10L 2015/228; G10L 2015/223; H04N 5/378; H04N 7/147; H04N 7/18
See application file for complete search history.

(56) References Cited

U.S. PATENT DOCUMENTS

| | | | |
|---|---|---|---|
| 2003/0006275 A1* | 1/2003 | Gray | A47G 29/14 232/19 |
| 2006/0056386 A1* | 3/2006 | Stogel | H04L 29/06027 370/351 |

(Continued)

*Primary Examiner* — Phung-Hoang J Nguyen

(57) ABSTRACT

An accessible electronic door entry system that includes an outdoor panel that comprises a capturing microphone, an analog audio interface that digitizes sound, a threshold detector that discriminates the quality of the sound, acoustic models that represent the pronunciation of phonemes, a phoneme generator, contexts that represent the assembly of words and/or phrases and grammatical rules, a recognizer that compares the phonemes, an analyzer of words and/or phrases, a text-to-speech or TTS converter, an analog audio interface that converts the digital signals into analog ones, a communications bus of the electronic door entry system, an electronic door entry system interface that connects the bus and transmits the detected commands to the terminals and establishes the audio and/or video communication, a loudspeaker that plays the audio signals, an agenda, a RAM memory, a Flash memory and a CPU or processor that controls and manages the rest of the elements of said panel.

24 Claims, 1 Drawing Sheet

(51) Int. Cl.
*H04N 7/18* (2006.01)
*G10L 13/02* (2013.01)

(56) References Cited

U.S. PATENT DOCUMENTS

| | | | |
|---|---|---|---|
| 2007/0103541 A1* | 5/2007 | Carter | H04N 7/142 348/14.06 |
| 2008/0223927 A1* | 9/2008 | Otaka | G07C 9/00111 235/382 |
| 2008/0224859 A1* | 9/2008 | Li | G07C 9/00087 340/540 |
| 2008/0238669 A1* | 10/2008 | Linford | E05B 45/06 340/542 |
| 2009/0121869 A1* | 5/2009 | Graichen | G06K 9/00771 340/541 |
| 2010/0057461 A1* | 3/2010 | Neubacher | G10L 15/063 704/243 |
| 2013/0057695 A1* | 3/2013 | Huisking | H04N 7/186 348/156 |
| 2016/0232728 A1* | 8/2016 | Allibhoy | G07C 9/00309 |
| 2016/0378961 A1* | 12/2016 | Park | G06F 21/32 726/19 |

* cited by examiner

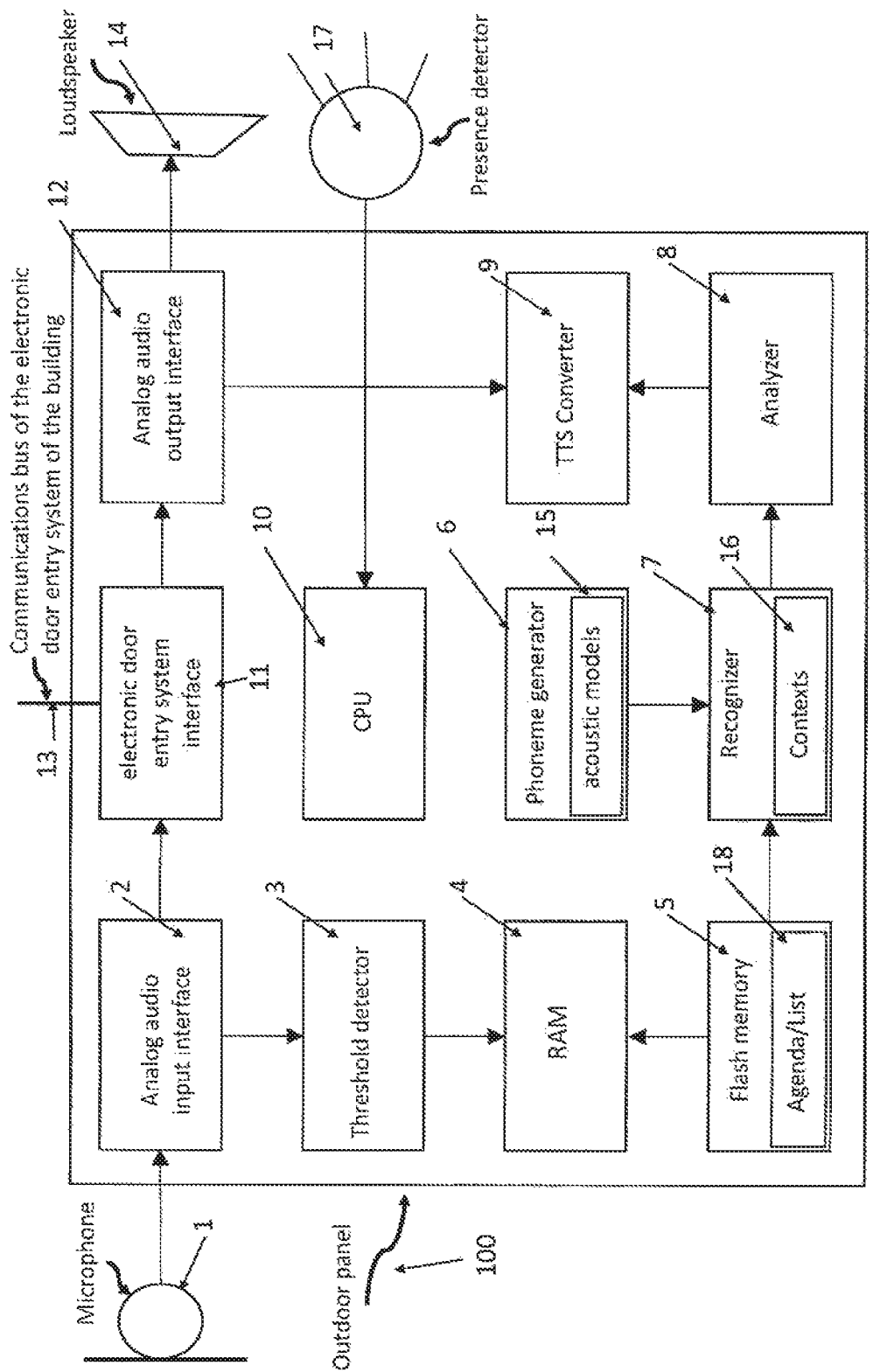

ACCESSIBLE ELECTRONIC DOOR ENTRY SYSTEM

RELATED APPLICATION

This application claims the benefit of priority of Spanish Utility Model No. 201631302 filed Oct. 31, 2016, the contents of which are incorporated herein by reference in their entirety.

FIELD AND BACKGROUND OF THE INVENTION

The present invention relates in general to communications systems and equipment. In particular, the invention relates to electronic outdoor panels for door entry systems and video door entry systems, which in general facilitate accessibility for anyone, but particularly for handicapped persons.

Outdoor panels for electronic door entry systems and video door entry systems are used to communicate between people that are outdoors and the residents of a dwelling, and to do so, it is previously required that a call be made to the dwelling, for which reason individual push buttons that have a label associated with the number of the dwelling or the name of the resident in order to be able to locate them; a keypad like a telephone, which can be mechanical and/or be on a touch screen that enables dialing the number of the dwelling; or an agenda of names that can be moved until the resident is located and selected, are usually used.

Although these systems have been used for a long time and have been perfected over the years, they still entail a series of problems for certain groups, as indicated below.

People with visual disabilities have problems calling a dwelling since they cannot locate the push button to call it, since they are not able to read the label associated with it or, in the case of the outdoor panel that incorporates an agenda that is already printed or on an electronic screen, they are not able to visualize the name of the person they want to contact.

People with physical-motor disabilities, who, for example, move in wheelchairs, cannot reach the corresponding push button or keypad in order to make the call since the outdoor panel is usually installed at a height comfortable for persons that are standing.

People with difficulty moving their upper limbs or fingers cannot push the buttons or type codes on the keypad.

In this same context, deliverymen usually have their hands full, which makes it difficult for them to call the dwelling to which they need to make the delivery.

Due to security or privacy, names are sometimes not shown on the card holders associated with the call push buttons and only the number of the dwelling is shown, such that if the number of the dwelling where they live is not known, they cannot be located and called.

Attempts to solve the problems described above have been made, but a solution has not been found that solves them all at the same time.

For example, transparent adhesive tags can be used with the dwelling number engraved in Braille and placed over the card holder associated with each push button. This solution is complex when names must be labeled and it requires a personalized process that makes the installation of the equipment slower and more expensive. Furthermore, they can be taken off easily or they wear down as time goes by since they are not protected by the card carrier. Another limitation is found in the proportion of blind people who are able to read Braille, which is estimated at 1%, and even more so now that there are new technologies with screen reading by means of voice synthesis.

There are countries where the local accessibility code requires the placement of outdoor panels at a height accessible to people in wheelchairs, which hinders use for people who are standing because they have to bend over in order to use it, or requires duplicating the outdoor panel, which causes discomfort of use or a higher cost respectively.

An interesting solution that is already used in personal devices such as smartphones or tablets, as well as in computers, are voice recognition systems and assistants such as Siri (Apple), Google Now (Google), Alexa (Amazon) or Cortana (Microsoft). These systems, however, cannot be implemented in an outdoor panel to resolve the previous problems since they have the following limitations:

They require pressing a button or pronouncing a keyword that starts the recognition motor, thus preventing any word that is pronounced in the proximity thereof from being interpreted as an order or request for information. For example, Siri requires pressing the home button of the iPhone for a time, just as Cortana requires pressing a specific button, Google Now requires saying the phrase 'Hello Google' and Alexa requires saying the word 'Alexa'. A user of an outdoor panel does not have any reason to know these calling methods since they will use it sporadically. In the case of blind people, we will come back to the problem of detecting where the push button is.

These voice-recognition assistance systems are based on recognition in the cloud by means of external servers that process the information. An electronic door entry system panel does not normally have this connectivity.

These systems use short-range acoustic systems, normally no more than 20 cm, since they are intended for personal devices that would not be useful in the case of an outdoor panel since the user is usually at an arm's length away, in other words, around 50 cm, and furthermore they do not tolerate ambient noise and therefore do not work well outdoors.

Some attempts at using this voice recognition technology in the field of electronic door entry systems have been made, but all of them also rely on the need to push a button, which for the previous groups, mainly the physically disabled and blind, is a drawback, or they rely on the detection of the person by means of a proximity detector, which can fail in the case of people in wheelchairs.

In the state of the art, patent applications such as GR20140100122A, EP2448233A1, DE19954844A1 or utility model CN204496627U require pressing the activation button of the voice recognizer. Furthermore, they are limited to recognizing the names of the residents and do not make it possible to call by means of the number of the dwelling, since the name of the person is sometimes unknown or not provided because of privacy. Furthermore, this presents a drawback in the installation since when said installation is completed, nobody is living in the building and therefore it does not have this information, for which reason calls will not be able to be made until the corresponding name is configured. Another characteristic of these applications is that they do not enable changing the language in a dynamic manner so that foreigners are able to use it without problems.

Besides these generic problems, each of these documents has the following specific problems:

In application GR20140100122A, the voice recognition equipment is a complement to the electronic door entry system panel that incorporates its own microphone and loudspeaker, for which reason it entails an added cost, is more complex to install and does not discern the conversation of the user with the dwelling from the input of the call name, giving rise to misinterpretations, and furthermore, it requires broadband internet connection to start perfecting the acoustic model in order to improve recognition.

Document EP2448233A1 does not take into account the privacy of people, since when a doubt comes up between two names, it plays both of them so that the user may select one.

In DE19954844A1 the objective is to eliminate the call push buttons for which reason it impairs people with speech impairments or that do not know the local language.

The utility model CN204496627U enables making the call exclusively by using the dwelling number but not the name and it does not distinguish whether the vocalized number is for calling the dwelling or for opening the door.

Therefore, the current state of the art does not precede a system capable of resolving the previously described problems as a whole and in a satisfactory manner that enables making the call to the dwelling by using voice commands without requiring the recognition motor to be previously activated, when the user is in front of the outdoor panel, by means of a push button for that purpose and/or a presence detector, and by indistinctly using the number of the dwelling or the name of the resident in the voice call command. Neither possesses both modalities.

All of these precedents are limited to making the call to the dwelling by only indicating the name of the resident without previously identifying the command, for which reason they do not enable other voice command options, such as asking for help in using the outdoor panel or calling the concierge or even configuring the operations thereof by the installer or maintenance personnel.

SUMMARY OF THE INVENTION

It is necessary to offer an alternative to the state of the art that covers the gaps found therein, particularly in order to improve the current usability of the outdoor panels of the electronic door entry systems and video door entry systems as will be described below.

With this aim, the present invention provides an accessible electronic door entry system that includes an outdoor panel (100) where said outdoor panel (100) comprises a microphone (1) arranged to capture the sound close to said panel (100), an analog audio input interface (2) arranged to digitize the sound captured by said microphone (1), a threshold detector (3) arranged to discriminate whether the captured sound has enough quality for it to be treated, one or several acoustic models (15) that represent, each one of them, the pronunciation of phonemes in a language, a phoneme generator (6) arranged to detect phonemes from said captured and discriminated sound, one or several contexts (16) that represent the group of words and/or phrases and grammatical rules that can be recognized from said detected phonemes, a recognizer (7) arranged to compare said detected phonemes with at least one of said contexts (16) and recognize one or several words and/or phrases, an analyzer (8) arranged to analyze said recognized words and/or phrases and determine whether they are accepted as commands and/or identifiers of users or numbers. A text-to-speech or TTS converter (9) arranged for playing voice messages to the user of the panel (100), an analog audio output interface (12) arranged to convert the digital signals received from the text-to-speech or TTS converter (9) corresponding to the voice message to be played into analog signals, a communications bus of the electronic door entry system of the building (13) arranged to establish the communications or calls between the outdoor panel (100) and the terminals of the dwellings and/or concierge, an electronic door entry system interface (11) arranged to communicate with said communications bus (13) and transmit the detected commands to the terminals of the dwellings and establish audio and/or video communication with them, a loudspeaker (14) arranged to play the audio signals in the outdoor panel (100), an agenda or list (18) arranged to contain names or professional activity of the residents of the dwelling, a RAM memory (4) arranged to store in a volatile way the information and data necessary for recognition and the software of the distinct elements that are being executed, a Flash memory (5) arranged to store in a non-volatile manner the information and data necessary for the recognition and the software of the distinct elements and a CPU or processor (10) arranged to control and manage the rest of the elements of said outdoor panel (100).

Thus, unlike the existing solutions, the outdoor panel (100) object of the present invention incorporates a voice recognition system regardless of the user in order to be able to recognize any person that uses it, apart from having the classic calling means such as the push buttons, keypad or electronic agenda. The cited recognizer continuously functions when the outdoor panel (100) is at rest in order to attend any request and does not require any action on behalf of the user such as the pushing of a button or the detection of presence by means of a proximity sensor.

Said electronic door entry system panel (100) accepts commands to call dwellings by means of any natural vocal expression that the user usually uses such as 'to call', 'to dial', 'to contact', 'to speak', followed by the name of the resident, professional activity ('dentist', 'lawyer') or the number of the dwelling designated below, in different modalities such as natural numbers ('one hundred and twenty-three'), digit by digit ('one two three'), pairs of digits ('one twenty-three' or 'twelve three'), ordinal numbers ('second') and in combination with letters ('second B'). In this way the user does not have to follow strict call rules and it adapts to the habits of each region or country.

Furthermore, said panel accepts and discriminates commands for help using it ('help, 'What is their name?', ... ) or for communicating with a concierge or security guard ('concierge', 'guard', ... ). It further enables configuring the equipment by means of voice commands that the installer or maintenance personnel use ('audio volume 4', 'door opening time 4 seconds', ... ) with prior identification as installer.

Said outdoor panel generates feedback for the user by means of a synthesized voice that enables confirming if the action has been correctly understood in case of doubt.

The outdoor panel may, optionally, invite the user to use the voice call when it detects the presence of a person in front of the outdoor panel, by means of a presence detector, by reproducing a synthesized voice message that indicates how to use it by means of voice commands. Said presence detector does not start the recognition motor because it is continuously active, it simply plays the voice message. This option is especially useful for the blind that cannot read a message on a display or a sign that warns of use by means of voice.

Given that the outdoor panel uses voice synthesis to give feedback from the actions, it adapts to different levels of ambient noise so that the voice messages that it plays are done at a suitable volume so that they are understood without being too loud when there is little ambient noise (at night for example) or excessively low when there is an excess of noise (traffic in a congested street). It uses an automatic volume control based on the ambient noise.

The outdoor panel can be configured by the installer to operate with the default language of the country or dialect for recognition and voice synthesis by default, but it also adapts to the language of the speaker when enabling the change of the language in a dynamic manner when the when the user pronounces the name of the language that they want in their own tongue ('Español', 'Catalá', 'Galego', 'English', 'Française', 'Italiano', '中国' (Chinese), . . . ).

As can be deduced, with this invention the privacy of the residents is ensured if their names are not shown on the labels of the push buttons (only the dwelling number) or in the electronic agenda. The outdoor panel enables calling by voice command by using their name, if the user knows that they live in that building, it not being publicly displayed. The outdoor panel can be configured so that if the indicated last name coincides with several names, it does not ask which is being referred to by revealing the names of all the matches.

These and other advantages are evidently seen in light of the detailed description of the invention.

BRIEF DESCRIPTION OF THE SEVERAL VIEWS OF THE DRAWINGS

The previous advantages and characteristics, in addition to others, shall be understood more fully given the following detailed description of embodiments, with reference to the following FIGURE, which must be taken by way of illustration and not limitation.

FIG. 1 schematically shows the different elements that make up the electronic door entry system, generally implemented as an outdoor panel.

DESCRIPTION OF SPECIFIC EMBODIMENTS OF THE INVENTION

The elements defined in this detailed description are provided to help achieve a comprehensive understanding of the invention. As a result, a person skilled in the art will recognize that variations and modifications to the embodiments described in this document can be made without deviating from the scope and spirit of the invention. Moreover, a detailed description of the functions and the elements that are sufficiently known has been omitted for reasons of clarity and concision.

Of course, the distinct features of the invention can be implemented with different variations in architecture, protocols, devices or types of services and applications. Any implementation presented as follows is included with the purpose of illustrating and making the invention understandable and not with the intention of limiting aspects thereof. As seen in FIG. 1, the outdoor panel (100) includes different elements that enable implementing the feature described in the previous description.

Specifically, they are identified as:

Microphone (1). This element captures the sound near the outdoor panel (100). It is used both in the voice recognition as well as in the conversation with the dwelling called.

Analog audio input interface (2). It performs the digitization of the sound that the microphone (1) captures in order to carry out the sampling and it is treated numerically. It is an ADC converter (analog-to-digital). The captured sound is stored in a RAM memory (random access memory) (4). It is also used in the conversation with the dwellings when there is communication established between the panel and one of these dwellings.

Threshold detector (3). It is an element that discriminates the level of the input sound in order to indicate when it has sufficient quality to be analyzed by the voice recognizer. It can be a software module or hardware.

RAM (4). Volatile random access memory that stores the digitized voice samples, active acoustic models, voice recognition applications and voice synthesis and the data thereof at the time of execution, the application of the same electronic door entry system and the data thereof at the time of execution and the active contexts to be recognized.

Flash memory (5). Non-volatile memory that stores, among other things, the electronic door entry system application, voice synthesis and recognition applications, the agenda of names (18) of the outdoor panel (100), the acoustic models (15), contexts (16) and voices from the different languages that it recognizes and synthesizes, as well as all the information that it needs to be able to put it into practice.

Phoneme generator (6). Module, which can be implemented by software, which detects phoneme patterns in the captured audio samples in order to be analyzed. Said detection is based on the comparison of the detected and filtered sound with at least one of the acoustic models (15) with those that the panel (100) has and that is loaded in the RAM memory (4).

Recognizer (7). Module, which can be implemented by software, that analyzes the detected phonemes and compares them with the words and rules defined in the context of the grammar that it must recognize. The output of the analyzer (8) are the words and grammar phrases that have been detected together with a similarity score.

Analyzer (8). Software module that evaluates the detected words and rules and determines if they are accepted depending on the similarity score and on the context of the situation.

TTS (text-to-speech) (9). Text-to-speech converter for providing feedback or responses for the user by means of speech; in other words, for playing voice messages to the user of the panel if required, in the selected language.

CPU (10). Processor of the outdoor panel (100) that controls and manages the different hardware and software elements.

Electronic door entry system interface (11). It communicates with the installation bus of the building in order to be able to transmit the commands to the terminals of the dwellings and establish audio and video communication with them.

Analog audio output interface (12). It converts the digital voice synthesis signals into signals playable in the loudspeaker. Typically, it is a DAC converter (digital-to-analog converter) or PWM (pulse width modulator) converter. It is also used in the conversation with the dwellings in order to adapt the audio that comes from the terminals of the dwellings.

Communications bus of the electronic door entry system of the building (13). It establishes the communications between the outdoor panel (100) and the terminals of the dwellings.

Loudspeaker (14). It plays the audio signals in the outdoor panel (100).

Acoustic model (15). It is a representation of the pronunciation of the phonemes. It depends on each language. The acoustic model (15) is prepared to work with ambient noise and detection far from the speaker. There can be several acoustic models (15), one for each language, stored in the Flash memory (5), but at least one of them loaded in the RAM memory (4) to be used at a given moment.

Context (16). It represents the group of words and phrases, with their rules, that must be recognized expressed in phonemes. It depends on each language. Just like the acoustic models (15), there can be one or several stored in the Flash memory (5) and at least one of these is loaded into RAM memory (4) to be used at a given moment depending on the configuration carried out in the outdoor panel (100).

Presence detector (17). Device that detects the presence of a person in the proximity of the outdoor panel (100). When said close person is detected, a help message is emitted.

Agenda or list (18). It contains the list of names or professional activity of the residents with information about the associated dwelling.

With these elements, the outdoor panel (100) object of the invention, when it receives power, loads the software modules into the RAM memory (4) from the flash memory (5). Inside the modules that are loaded are all those that are related to voice recognition, the functional nature of which is prepared to start to work. Among them is the threshold detector (3), the phoneme generator (6), the recognizer (7) and the analyzer (8), together with the acoustic model (15) that the phoneme generator (6) must recognize and the context (16) that the analyzer (8) must recognize.

The acoustic model (15) that is applied at any time depends on the default language that has been configured by the installer in order for it to work and which can be changed dynamically. In other words, there can be one or several acoustic models loaded in the RAM memory (4) from those stored in Flash memory (5) to be used at any time depending on said configuration.

The context (16) contains information about the grammar that it must recognize, in other words, from the group of words and rules for the composition of the phrases, and it also depends on the language selected and the situation at that time. Thus, there are one or several contexts (16) in RAM memory (4) at any time of those stored in Flash memory (5). In the context (16), the agenda of names or professions that it must recognize (18) are included. A change in the agenda (18) causes an update of the context (16) in a dynamic manner.

The outdoor panel (100) at rest is waiting to detect sound in the proximity thereof and analyze it in order to determine if it is a voice command from the repertoire that it must recognize.

The processes or modes of operations of the electronic door entry system or outdoor panel (100) that occur are the following:

The microphone (1) gathers the ambient noise, and thus from the potential speaker, and digitizes it by means of the analog audio input interface (2). The audio samples are treated numerically, in other words, a quantization is performed and they are stored in the RAM memory (4) to be analyzed.

The threshold detector (3) measures the sound level and determines if it has a high enough level to ensure quality in the recognition. In this way, it rejects ambient noise of the environment or faraway conversations of people that pass through the street and do not contain information from the speaker who wants to use the outdoor panel (100). The sounds beyond the usual scope, for example, which come from a distance of more than a meter from the panel (100), are discarded for having too little energy. This measurement of the sound or noise level is also used to update the ambient noise value that will be taken into account when adjusting the playback volume of the voice message synthesis.

The phoneme generator (6) starts to operate when the threshold detector (3) notifies that there is sound with a high enough level to be considered suitable. It detects phonemes in the acquired audio signals and stores them again in the RAM (4) in order for them to be treated by the recognizer. At the same time, it rejects ambient noise that does not correspond to speech by filtering it.

The recognizer (7) compares the sequences of phonemes acquired with the elements from the work context (16) that it must recognize. Each language uses a different context with the specific words from each language that represent the different commands ('llamar', 'call', 'appel', 'chiamata', . . . ). Each change of the agenda (18) requires a modification of the context (16) which is carried out in a dynamic manner. If it changes state: rest, configuration of the equipment, etc., it also changes the grammar to be used and therefore, the context (16) so that in this way it prevents the recognition of actions that do not correspond to the current situation in which the outdoor panel (100) is found. One or several contexts (16) stored in Flash memory (5) can be had, but only a few can be active at any time in RAM (4), depending on the configuration of the equipment.

The recognizer (7) assigns scores to the different words and phrases that it recognizes depending on the similarity to the phrase gathered in the context. This score will determine whether it should accept the recognized command or not.

The analyzer (8) decides if the recognized phrase is accepted depending on said score and on the situation in which the system is found (rest, need to confirm, configuration, . . . ). To do so, two threshold values are used: 'reliable' and 'doubt', which are determined pragmatically with a series of experiences with different users.

If the score is higher than the 'reliable' threshold, the recognized command is executed: 'call dwelling 23A', 'talk with Jesus Garcia', 'contact lawyer' . . . and the action that was understood is vocalized, with additional information: dwelling number, name of the person that is desired to be contacted, etc. The analyzer (8) generates a text for this with the message to be played and invokes the TTS (9).

If several names that contain the vocalized name are detected, for example which share a last name, depending on the selected privacy mode, it will be requested that the correct name be indicated (privacy mode) or the matching names will be played and it will request that they choose the one they want (public mode), depending on the configuration of the system at the time.

If the score is between the 'reliable' threshold and the 'doubt' threshold, confirmation is required by means of a message played in the TTS (9) (for example: 'do you want to call Jesus Garcia?'), and if it is confirmed by means of some of the words that the context recognizes (such as for example: 'yes', 'correct', 'indeed', 'ok', . . . ), the understood command is accepted.

If the score is lower than the 'doubt' threshold, it is discarded, not generating feedback. In this way, an activation button is not necessary for the recognition or presence detector since it rejects any sound that does not have a minimum score, in other words, any sound that does not have a minimum quality level with regards to noise and that corresponds to the words and/or phrases from the active context (16).

When the analyzer (8) detects a valid command, it executes the required action:

In order to carry out the call to a dwelling, it analyzes whether a correct calling code or a name of a resident or professional activity included in the agenda (18) is used. In the case of a positive detection, in other words, that said name, code, etc. is properly recognized, the call command is sent to the terminal of the dwelling by means of the communications bus (13) and audio communication with it is established, and optionally video communication if the system has that capability. During a conversation with the dwelling, the voice recognition stays deactivated in order to prevent the detection of false commands. When the conversation ends, in other words, the communication with the dwelling is closed, the voice recognition starts again.

If it is a command to call the concierge the call is routed to their terminal.

If it is a command to change the language (for example: 'Español', 'Catalá', 'English', . . . ) the context (16) is updated in the recognizer (7), in other words, it is loaded from the Flash memory (5) where it is stored and the acoustic model (15) in the phoneme generator (6), such that voice commands in the new language can be accepted. After the recognition in the new language, or after a pre-configured time has passed without activity, it returns to the default language configured by the installer, loading the corresponding acoustic model (15) and context (16), the default ones according to the configuration at that time.

If it is a configuration command, an access code is requested by means of a message played in the TTS (9) and, if correct, a vocal configuration menu is accessed, in other words, also played by the TTS (9), in which the installer indicates the parameter to be configured and the desired value (such as for example: 'opening time three seconds'), the change being made in the parameter if the score from the analyzer (8) is above the 'reliable' threshold or asking for confirmation if it is under it but above the 'doubt' threshold. In each case, feedback is given by means of voice synthesis. There is also the option to consult the current value if the parameter is indicated but not a value, the response being given by means of voice synthesis (for example: 'opening time is 5 seconds'). The command 'exit' or a similar word returns the status of the outdoor panel (100) to the normal operating mode, ready to accept user commands. It also has a help command that indicates the parameters that are configurable by means of voice synthesis.

A help command causes it to play a synthesized message that explains how to operate by means of voice commands.

When the TTS converter (9) is invoked, it is loaded into RAM memory (4) to be executed at that time and it analyzes the text to be played, transforms it into a PCM audio file and sends it to the analog audio output interface (12) in order to convert the numerical signals into a playable format for the loudspeaker (14). The playback volume is adjusted depending on the ambient noise detected by the threshold detector (3). The text-to-speech converter, when invoked, uses the language that is active at that time.

Once the playback of the message has ended, the TTS module (8) is downloaded from the RAM memory (4), freeing up the space it occupied.

Optionally, the detection of the presence of people can be activated. In that case, when a user comes close to the outdoor panel (100) and the presence detector (17) detects them, a welcome and help message is generated by means of TTS (9), such that a person can know how to make the call by means of voice commands, which is especially useful for blind people. The voice recognizer is prepared to detect any command that is pronounced, regardless of whether the presence detection is performed or not. If sound is detected, it starts up the previously described recognition process.

In a differentiating manner, in voice recognition and in vocal feedback generation, the microphone and loudspeaker of the outdoor panel (100) are used, thus without requiring hardware additional to that which the normal outdoor panels already have for these features.

The recognition system is embedded in the outdoor panel (100) of the audio or video door entry system, sharing most of the elements that it already uses to carry out the function thereof (microphone, speaker, analog interfaces, CPU, memory) and it incorporates the new features by means of specific software for voice recognition and text-to-speech conversion. Thus, it is not an added system nor does it require internet connection, and the appearance of the outdoor panel is like that of a conventional panel of an electronic door entry system or video door entry system.

The grammar that it handles enables carrying out different actions by using voice commands in normal language, without needing to follow a rigid structure, in other words, it enables calling a dwelling or the concierge, consulting whether a certain person lives in the building, requesting help for using it, and configuring the operation parameters by the installer, among others.

In the case of a call to a dwelling, it enables different call modalities: by means of the name of the person that they want to call, the professional activity or the dwelling number. In this last case, it handles different forms of indicating the number: a natural number ('one hundred and twenty-three', . . . ), digit by digit ('one two three'), by means of pairs or combination with digits ('twelve three' or 'one twenty-three'), by means of ordinal numbers ('fifth') and it always enables adding a letter after it in order to designate a dwelling of a floor ('first B' o 'twelve C').

What is claimed is:

1. An accessible electronic door entry system that includes an outdoor panel characterized in that said outdoor panel comprises:
   a microphone arranged to capture a sound close to said panel,
   an analog audio input interface arranged to digitize the sound captured by said microphone,
   a threshold detector arranged to discriminate whether the captured sound has enough quality for it to be treated,
   one or several acoustic models that represent, each one of them, the pronunciation of phonemes of a language, a phoneme generator arranged to detect phonemes from said captured and discriminated sound,
one or several contexts that represent the group of words and phrases and grammatical rules that can be recognized from said detected phonemes,
a recognizer arranged to compare said detected phonemes with at least one of said contexts and to recognize one or several words and/or phrases,
an analyzer arranged to analyze said recognized words and phrases and determine if they are accepted as commands and identifiers of users or numbers,
a text-to-speech or TTS converter arranged to play voice messages in form of digital signals to a user of the panel,
an analog audio output interface arranged to convert the digital signals received from the text-to-speech converter corresponding to the voice message to be played into analog signals,
a communications bus of the electronic door entry system of a building arranged to establish communications or calls between the outdoor panel and some terminals of dwellings or concierge of the building,
an electronic door entry system interface arranged to communicate with said communications bus and transmit some detected commands to the terminals of the dwellings and establish audio or video communication with them,
a loudspeaker arranged to play the analog signals in the outdoor panel, an agenda or list arranged to contain names or professional activity of residents of the dwellings,
a RAM memory arranged to store in a volatile manner some information and data necessary for the recognition and a software of distinct elements that are being A executed;
a Flash memory arranged to store in a non-volatile manner the information and data necessary for the recognition and the software of the distinct elements and
a CPU arranged to control and manage the elements of said outdoor panel.

2. The accessible electronic door entry system according to claim 1, characterized in that said microphone is used both; to recognize words and phrases as well as for established communications or calls between the outdoor panel and the terminals of dwellings.

3. The accessible electronic door entry system according to claim 1, characterized in that said analog audio input interface is an ADC converter (analog-to-digital converter) and where the sound digitized by said interface is stored in said RAM memory.

4. The accessible electronic door entry system according to claim 1, characterized in that said threshold detector discriminates the captured sound by filtering, letting what has enough power pass through and therefore, it is considered that it was generated at less than a certain distance from said outdoor panel.

5. The accessible electronic door entry system according to claim 4, characterized in that said acoustic models are prepared to work with ambient noise and detection far from the user of the panel, and wherein said acoustic models are stored in said Flash memory and wherein at least one of them is loaded in RAM memory and is used during the recognition of words and phrases t of the captured and filtered sound.

6. The accessible electronic door entry system according to claim 5, characterized in that said phoneme generator starts operations when said threshold detector detects that there is sound with enough power, filters the noise of said sound that does not correspond with a voice, detects said phonemes by using the at least one acoustic model loaded in RAM memory and stores the detected phonemes in said RAM memory.

7. The accessible electronic door entry system according to claim 4, characterized in that said contexts are stored in said Flash memory and where at least one of them is loaded in RAM memory and is used during the recognition of words and phrases of the captured and filtered sound together with said agenda.

8. The accessible electronic door entry system according to claim 1, characterized in that said recognizer assigns scores to said recognized words and phrases depending on similarity with said words and phrases and rules represented in said at least one context and said agenda.

9. The accessible electronic door entry system according to claim 8, characterized in that said analyzer determines whether said words and phrases are accepted based on said scores assigned by said recognizer such that if the score is above a first threshold it is considered that said word and phrase is reliable; if it is under said first threshold and above a second lower threshold it is considered that there is doubt as to whether said word and phrase is the one indicated in the context and it is requested that said user, through said TTS, confirm said recognized words and phrases; and if it is under said second threshold a subsequent treatment of said phrase and word is discarded.

10. The accessible electronic door entry system according to claim 9, characterized in that when said analyzer detects a reliable command it executes an action associated with said command and it is confirmed through the TTS.

11. The accessible electronic door entry system according to claim 10, characterized in that said command is a command for making a call to a dwelling associated with a username or activity or a dwelling identifier or it is a call to said concierge of the building and wherein said action consists of making said call to said dwelling or concierge of the building by means of said communications bus.

12. The accessible electronic door entry system according to claim 11, characterized in that if it is detected that there are several names or activities that could match what was recognized in said command, it is indicated to the user, through the TTS, that they indicate the full name in order to guarantee the privacy of the users of the system.

13. The accessible electronic door entry system according to claim 11, characterized in that said command to make a call to an associated dwelling is a command recognized in a natural vocal expression such as, and not by limitation, 'call', 'dial', 'contact' or 'speak' in order to describe the action, a professional activity such as, and not by limitation, 'dentist' or 'lawyer' or the number of the dwelling in different modalities such as, and not by limitation, with natural numbers such as 'one hundred and twenty-three', digit by digit such as 'one two three', pairs of digits such as 'one twenty-three' or 'twelve three', ordinal numbers such as 'second' or in combination with letters 'second B'.

14. The accessible electronic door entry system according to claim 11, characterized in that during said call to said dwelling or concierge of the building said recognition of words and phrases of said panel is deactivated and is activated again once said call is ended.

15. The accessible electronic door entry system according to claim 10, characterized in that said command is a command to change the language and wherein said action associated with said command consists of updating the context in the recognizer and the acoustic model in the phoneme generator from the Flash memory related to said language.

16. The accessible electronic door entry system according to claim 15, characterized in that said language changed, or after a pre-configured time has passed without activity, it returns to the previous language, updating itself from the Flash memory with the previous acoustic model and context.

17. The accessible electronic door entry system according to claim 10, characterized in that said command is a command to configure parameters of said panel and wherein said action consists of playing a vocal menu of configuration options through the TTS and recognizing thereafter a next command with a parameter and a value to be changed.

18. The accessible electronic door entry system according to claim 17, characterized in that prior to playing said vocal configuration menu, an access code is requested through the TTS and is recognized in order to securely access said menu.

19. The accessible electronic door entry system according to claim 1, characterized in that said text-to-speech converter or TTS, when it is invoked to play a message to said user of the panel, is loaded in RAM memory, analyzes the text to be played, transforming it into an audio file in PCM format, sends it to said analog output interface and when it ends, said message is downloaded from said RAM memory, using at all times the active language that it has at that time.

20. The accessible electronic door entry system according to claim 1, characterized in that said analog output interface is a DAC converter digital-to-analog converter) or a PWM (pulse width modulator).

21. The accessible electronic door entry system according to claim 1, characterized in that said analog output interface is used both to convert messages from the TTS as well as digital audio coming from said established communications or calls between the outdoor panel and the terminals of dwellings or concierge of building.

22. The accessible electronic door entry system according to claim 1, characterized in that said analog output interface adapts its volume based on a level of ambient noise detected by said threshold detector.

23. The accessible electronic door entry system according to claim 1, characterized in that said panel additionally includes a detector of presence arranged to detect proximity of a person to said panel and when said presence is detected it plays a help message about how to use said panel.

24. The accessible electronic door entry system according to claim 3, characterized in that said analog audio input interface is additionally used in said established communications or calls between the outdoor panel and the terminals of dwellings or concierge of building.

\* \* \* \* \*